US009239876B2

(12) United States Patent
Kraley (10) Patent No.: US 9,239,876 B2
(45) Date of Patent: Jan. 19, 2016

(54) AUTOMATIC DOCUMENT CLASSIFICATION VIA CONTENT ANALYSIS AT STORAGE TIME

(71) Applicant: Adobe Systems Incorporated, San Jose, CA (US)

(72) Inventor: Michael Kraley, Lexington, MA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 376 days.

(21) Appl. No.: 13/692,699

(22) Filed: Dec. 3, 2012

(65) Prior Publication Data

US 2014/0156665 A1    Jun. 5, 2014

(51) Int. Cl.
*G06F 17/30*    (2006.01)
(52) U.S. Cl.
CPC .... *G06F 17/30705* (2013.01); *G06F 17/30067* (2013.01); *G06F 17/30103* (2013.01); *G06F 17/30106* (2013.01); *G06F 17/30194* (2013.01)
(58) Field of Classification Search
CPC .................... Y10S 707/953; Y10S 707/99933; G06F 17/30067; G06F 17/30103; G06F 17/30106; G06F 17/30194
USPC .......................................... 707/705, 706, 722
See application file for complete search history.

(56) References Cited

U.S. PATENT DOCUMENTS 6,553,365 B1 *  4/2003  Summerlin et al. .......... 707/740
7,478,088 B2 *  1/2009  Summerlin et al.

OTHER PUBLICATIONS

AlchemyAPI—Concept Tagging, printed on Oct. 27, 2012 from Internet at URL: http://www.alchemyapi.com/api/concept/, 2 pages, Orchestr8, LLC, © 2012.
AlchemyAPI—AlchemyAPI Overview, printed on Oct. 27, 2012 from Internet URL: http://www.alchemyapi.com/api/, 5 pages, Orchestr8, LLC, © 2012.
Automatic Classification and Taxonomy Generation, printed on Oct. 27, 2012 from Internet URL: http://www.autonomy.com/content/Functionality/idol-functionality-categorization/index.en.html, 1 page.
Carrot Search: document clustering and visualization software, printed on Oct. 27, 2012 from Internet URL: http://www.carrotsearch.com/, 1 page, © 2002-2012.
Carrot Search: Lingo3G: Text Document Clustering Engine—Lingo3G: text document clustering engine, printed on Oct. 27, 2012 from Internet URL: http://www.carrotearch.com/lingo3g-overview.html, 2 pages, © 2002-2012.

(Continued)

*Primary Examiner* — Cheryl Lewis
(74) *Attorney, Agent, or Firm* — Finch & Maloney PLLC (57) ABSTRACT

Techniques are disclosed for efficiently and automatically classifying textual documents or files. In some embodiments, the classification process is integrated into or otherwise made part of the storage function, such that when the user initiates a save process for a given file, the file is processed through a classifier prior to (or contemporaneously with) completing the save function. In some such embodiments, textual content of the file is analyzed using natural language processing to identify a main or substantial concept discussed in the file, and one or more corresponding tags are then assigned to that file. Subsequently, the user can access that file based on the one or more tags, for instance, through a user interface that allows the user to select one or more content categories associated with the assigned tags. The files can be text-based, but may include other content as well, such as images, video, and audio.

22 Claims, 7 Drawing Sheets

(56) References Cited

OTHER PUBLICATIONS

Dragon Toolkit: The Dragon Toolkit (Version 1.3.3. Jan. 16, 2008), Designed for Text Retrieval and Text Mining, Drexel University, printed on Oct. 27, 2012 from Internet URL: http://www.dragon.ischool.drexel.edu/, 1 page, Version 1.3.3, dated Jan. 16, 2008.

Xiaohua Zhou, et al, Dragon Toolkit: Incorporating Auto-learned Semantic Knowledge into Large-Scale Text Retrieval and Mining, ICTAI '07 Proceedings of the 19th IEEE International Conference on Tools with Artificial Intelligence—vol. 02, pp. 197-201, IEEE Computer Society Washington, DC, USA © 2007.

Concept Topics / Lexalytics, Concept Topics, printed on Oct. 27, 2012 from Internet URL: http://www.lexalytics.com/technical-info/concept-topic-classifier, 1 page.

Wei Qi, et al, Integrating Visual, Audio and Text Analysis for News Video, Microsoft Research, 4 pages, Microsoft Research, Beijing, China Sep. 2000, 4 pages.

Natural Language Toolkit—NITK 2.0 documentation, Natural Language Toolkit, printed on Oct. 27, 2012 from Internet URL: http://nitk.org/, 2 pages.

Salience Engine / Lexalytics, Salience Engine, printed on Oct. 27, 2012 from Internet URL: http://www.lexalytics.com/technical-info/salience-engine-for-text-analysis, 1 page.

* cited by examiner

User Selectable File Categories

| Advertizing | ☐ | Computer Hardware | ☐ | Health | ☐ | Politics | ☐ | Social Media | ☐ |
|---|---|---|---|---|---|---|---|---|---|
| Agriculture | ☐ | Contracts | ☐ | Home | ☐ | Presentations | ☐ | Sociology | ☐ |
| Art | ☐ | Crime | ☐ | Hotels | ☐ | Real Estate | ☐ | Software and Internet | ☐ |
| Auto | ☐ | Disasters | ☐ | Intellectual Property | ☐ | Receipts | ☐ | Space | ☐ |
| Aviation | ☐ | Economics | ☐ | Investing | ☐ | Recipes | ☐ | Sports | ☐ |
| Banking | ☐ | Education | ☐ | Labor | ☐ | Religion | ☐ | Technology | ☐ |
| Beverages | ☐ | Elections | ☐ | Law | ☐ | Renewable Energy | ☐ | Traditional Energy | ☐ |
| Biotech | ☐ | Fashion | ☐ | Marriage | ☐ | Resumes | ☐ | Travel | ☐ |
| Books | ☐ | Finance | ☐ | Mobile Devices | ☐ | Robotics | ☐ | Video Games | ☐ |
| Business | ☐ | Food | ☐ | Philosophy | ☐ | Science | ☐ | War | ☐ |
|  |  |  |  |  |  |  |  | Weather | ☐ |

```
Affordable Cars.pdf            Home Values Boston.pdf       Word Series.pdf
Alcatraz.pdf                   Invention Prototype.ppt      World Series Stats.doc
Alternate Engineering Jobs.pdf License Agreement.pdf
Auto Resale Values.txt         MLB Batting Stats.pdf
Boston – North End.pdf         Mortgage Rate Trends.pdf
Campaign Finance Reform.pdf    My Patent.pdf
Cape Cod Vacation.pdf          Northern Pass.pdf
Car and Driver 2012 Review.pdf San Francisco.pdf
Debate Analysis.pdf            ScenicDrives.pdf
Detroit Tigers Line-up.txt     Senate Race MA.pdf
Figures.pdf                    SF Giants.pdf
Fracking Issues.pdf            Tech Gadgets Report.html
Gas Mileage.pdf                Top 10 Stocks.pdf
Gas Price Trends.pdf           Top 10 Mutual Funds.pdf
```

Scroll Bar

File Listing

User Selectable File Categories

| | | | | | | | | | |
|---|---|---|---|---|---|---|---|---|---|
| Advertising | ☐ | Computer Hardware | ☐ | Health | ☐ | Politics | ☐ | Social Media | ☐ |
| Agriculture | ☐ | Contracts | ☐ | Home | ☐ | Presentations | ☐ | Sociology | ☐ |
| Art | ☐ | Crime | ☐ | Hotels | ☐ | Real Estate | ☐ | Software and Internet | ☐ |
| Auto | ☐ | Disasters | ☐ | Intellectual Property | [X] | Receipts | ☐ | Space | ☐ |
| Aviation | ☐ | Economics | ☐ | Investing | ☐ | Recipes | ☐ | Sports | ☐ |
| Banking | ☐ | Education | ☐ | Labor | ☐ | Religion | ☐ | Technology | ☐ |
| Beverages | ☐ | Elections | ☐ | Law | ☐ | Renewable Energy | ☐ | Traditional Energy | ☐ |
| Biotech | ☐ | Fashion | ☐ | Marriage | ☐ | Resumes | ☐ | Travel | ☐ |
| Books | ☐ | Finance | ☐ | Mobile Devices | ☐ | Robotics | ☐ | Video Games | ☐ |
| Business | ☐ | Food | ☐ | Philosophy | ☐ | Science | ☐ | War | ☐ |
| | | | | | | | | Weather | ☐ |

File Listing:

Affordable Cars.pdf
Alcatraz.pdf
Alternate Engineering Jobs.pdf
Auto Resale Values.txt
Boston – North End.pdf
Campaign Finance Reform.pdf
Cape Cod Vacation.pdf
Car and Driver 2012 Review.pdf
Debate Analysis.pdf
Detroit Tigers Line-up.txt
Figures.pdf
Fracking Issues.pdf
Gas Mileage.pdf
Gas Price Trends.pdf Home Values Boston.pdf
Invention Prototype.ppt
License Agreement.pdf
MLB Batting Stats.pdf
Mortgage Rate Trends.pdf
My Patent.pdf
Northern Pass.pdf
San Francisco.pdf
ScenicDrives.pdf
Senate Race MA.pdf
SF Giants.pdf
Tech Gadgets Report.html
Top 10 Stocks.pdf
Top 10 Mutual Funds.pdf World Series.pdf
World Series Stats.doc Scroll Bar

Fig. 5c

User Selectable File Categories

| Advertising | ☐ | Computer Hardware | ☐ | Health | ☐ | Politics | ☐ | Social Media | ☐ |
|---|---|---|---|---|---|---|---|---|---|
| Agriculture | ☐ | Contracts | ☐ | Home | ☐ | Presentations | ☐ | Sociology | ☐ |
| Art | ☐ | Crime | ☐ | Hotels | ☐ | Real Estate | ☐ | Software and Internet | ☐ |
| Auto | ☐ | Disasters | ☐ | Intellectual Property | ☐ | Receipts | ☐ | Space | ☐ |
| Aviation | ☐ | Economics | ☐ | Investing | [X] | Recipes | ☐ | Sports | ☐ |
| Banking | ☐ | Education | ☐ | Labor | ☐ | Religion | ☐ | Technology | ☐ |
| Beverages | ☐ | Elections | ☐ | Law | ☐ | Renewable Energy | [X] | Traditional Energy | [X] |
| Biotech | ☐ | Fashion | ☐ | Marriage | ☐ | Resumes | ☐ | Travel | ☐ |
| Books | ☐ | Finance | ☐ | Mobile Devices | ☐ | Robotics | ☐ | Video Games | ☐ |
| Business | ☐ | Food | ☐ | Philosophy | ☐ | Science | ☐ | War | ☐ |
|  |  |  |  |  |  |  |  | Weather | ☐ |

Affordable Cars.pdf    Home Values Boston.pdf    World Series.pdf
Alcatraz.pdf    Invention Prototype.ppt    World Series Stats.doc
Alternate Engineering Jobs.pdf    License Agreement.pdf
Auto Resale Values.txt    MLB
Boston – North End.pdf    Mor
Campaign Finance Reform.pdf    My P    Save Portfolio?
Cape Cod Vacation.pdf    North
Car and Driver 2012 Review.pdf    San F    [ cancel ]  [ Save As ]
Debate Analysis.pdf    Sceni
Detroit Tigers Line-up.txt    Senate Race MA.pdf
Figures.pdf    SF Giants.pdf
Fracking Issues.pdf    Tech Gadgets Report.html
Gas Mileage.pdf    Top 10 Stocks.pdf
Gas Price Trends.pdf    Top 10 Mutual Funds.pdf

Scroll Bar

Pop-up Window

File Listing

Fig. 5d

AUTOMATIC DOCUMENT CLASSIFICATION VIA CONTENT ANALYSIS AT STORAGE TIME

FIELD OF THE DISCLOSURE

This disclosure relates to document classification, and more particularly, to automatic classification of textual documents via content analysis that is carried out as part of storage function.

BACKGROUND

Online cloud-based document repositories are becoming popular places for users to store their content. There are a number of non-trivial issues that arise in the context of such operations.

BRIEF DESCRIPTION OF THE DRAWINGS

FIGS. 5a-5d each illustrates an example screen shot of a graphical user interface that can be employed by a document classification system, in accordance with an embodiment of the present invention.

DETAILED DESCRIPTION

Techniques are disclosed for efficiently and automatically classifying textual documents or files. In some embodiments, the classification process is integrated into or otherwise made part of the storage function, such that when the user initiates the save process for a given file, the file is processed through a classifier prior to (or contemporaneously with) completing the save function. In some such embodiments, textual content of the file is analyzed using natural language processing to identify the main concept or an otherwise substantial concept discussed in the document, and one or more corresponding tags are then assigned to that document. Subsequently, the user can access that document based on the one or more tags, for instance, through a user interface that allows the user to select one or more content categories associated with the assigned tags. The files can be text-based, but may include other content as well, such as images, video, and audio. The text to be analyzed may be provided as discrete text within the document. In addition, or alternatively, the targeted text can be extracted from images, audio, and/or video content. Numerous configurations and variations will be apparent in light of this disclosure.

General Overview

As previously explained, there are a number of non-trivial issues that arise in the context of storing content in cloud-based document repositories. For instance, the more files a given user decides to store in the cloud using an Internet-based service, the harder it becomes to locate a desired file (or files) later on. Sufficiently diligent users may invest the time to manually create an appropriate folder structure and assign each file accordingly. Other users may choose to take advantage of more flexible manual tagging facilities typically available. Such typical repository facilities generally necessitate a field-based metadata structure and/or keyword-based search with which the user must comply, and require discipline and up-front effort by the user, and further assume that the structure envisioned at the time of filing is still relevant at the time of retrieval. In addition, repository facilities that provide full-text content searching typically employ keyword-based search which may include synonyms, but generally lack the ability to identify concepts. For instance, a keyword-based full-text search using the term 'transportation' will not identify a document about aviation or airports if that document does not use the term 'transportation'. Given such constraints and limitations, users of cloud-based diverse content repositories often resort to laborious scrolling through file listings, hoping the name of relevant files for which they are looking pop out.

Thus, and in accordance with an embodiment of the present invention, techniques are provided herein that utilize natural language processing (NLP) techniques to assist in automatically classifying textual content of files uploaded or otherwise provided to a content repository by a user. The repository may be, for example, an Internet-based storage or so-called cloud repository, or a local storage associated with the user's computing system/device or local area network (LAN). In some embodiments, as a file is uploaded or otherwise stored to the repository, it is passed through a semantic classification engine. The classification engine is configured to extract textual content of the file and to analyze that content and to produce a list of one or more suggested categories to which the file may be relevant. In some such embodiments, appropriate tags for each relevant category can then be assigned to that document. Tag assignment can be carried out, for example, by the cloud service and/or a tagging module in communication with (or integrated into) the classification engine. Numerous system configurations and varying degrees of integration or distributedness will be appreciated in light of this disclosure.

The analysis carried out by the classification engine may include, for instance, the review of the natural language in the file, so as to allow for not only word identification but also concept identification. Identifying a concept reflected in the content of a given document can be used to facilitate more accurate classification, and overcomes the previously noted limitation of keyword searching. Specifically, concept identification transcends mere association of meaning to single words, and instead looks at the collection of words analyzed to extract a more inclusive meaning of the overall content. This is why the category ultimately assigned to a given document may not be a word or phrase (or synonym thereof) that is actually used in the document.

The document to be classified and subsequently stored may be any file type and may have any format. The document may include, for instance, text only, but may also be a mixed media document that includes any combination of text, images, embedded video, embedded audio, and/or any other content. In some example cases, the text to be analyzed may be provided as discrete text comprising the file. In addition, or alternatively, the targeted text can be extracted from images comprising the document (e.g., using image analysis and optical character recognition, OCR, to extract imaged text), audio comprising the document (e.g., using an audio converter to extract aurally presented text), and/or video content comprising the document (e.g., using OCR-based image analysis and/or audio-to-text conversion to extract imaged and/or aurally presented text).

Example document formats include portable document format (PDF), rich text format (RTF), American Standard Code for Information Interchange (ASCII), hypertext mark-up language (HTML or HTM or MHTML or MHT) format, spreadsheet format (e.g., Adobe PageMaker, Microsoft Excel, etc), image format (e.g., JPEG, BMP, etc), presentation format (e.g., Adobe Presenter, Microsoft PowerPoint, etc), and word processing formats (e.g., Microsoft Word, Corel WordPerfect, etc). In a more general sense, the document may include any type of file that has content that can be extracted into text form and then analyzed to identify one or more concept categories. As will be appreciated in light of this disclosure, the techniques provided herein can be used with any number of file types regardless of the media therein (e.g., text, imagery, video, audio, etc), and the claimed invention is not intended to be limited to any particular file type.

There are numerous ways in which a user can take advantage of a repository populated in accordance with an embodiment of the present invention. For instance, a user may query a repository of files having assigned category tags as described herein so as to see a view of all files with a given tag (a sort of pseudo-folder or culled-down view that effectively lists only document files that satisfy the user query). For example, a search using the category tag of 'transportation' would list documents that discuss the concept of transportation, including a document about aviation or airports that does not actually use the term transportation. Likewise, the user may also retrieve all the documents with a given tag and collect them into a master document or portfolio or folder. A user could also specify multiple tags in a targeted search operation, such as a search where the categories of travel and accommodations/hotels are selected by the user.

In some embodiments, the user may also correct the automatically assigned categorization by manually adding, modifying, and/or removing tags. In some such example embodiments, the user-provided corrections provide valuable feedback that can be processed through a learning module, which can be used to tune or otherwise train the classification engine based on perceived user preferences. The user may also expressly provide preferences, if so desired. Numerous auto-refining schemes to train or otherwise customize the classification process per user feedback and preferences can be used, as will be appreciated in light of this disclosure.

System Architecture

Figure 1:
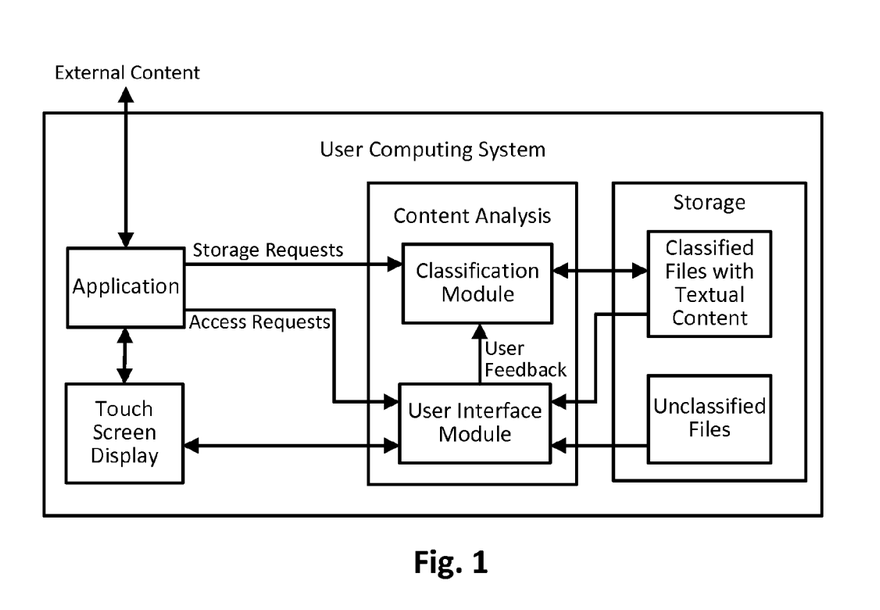
FIG. 1 illustrates a document classification system configured in accordance with an embodiment of the present invention.

FIG. 1 illustrates a document classification system configured in accordance with an embodiment of the present invention. As can be seen, the system of this example embodiment is integrated into a user's computing system, which may be, for example, a desktop or laptop computer, a workstation, a tablet, a smartphone, a game console, a set-top box, or other such computing devices. The system generally includes an application, a touch screen display, a content analysis section configured with a classification module and a user interface module, and a storage. Other componentry and modules typical of a computing system, such as processors (e.g. central processing unit and co-processor, graphics processor, etc), input devices (e.g., keyboard, mouse, touch pad, etc), and operating system, are not shown but will be readily apparent in light of this disclosure.

In operation, the user can interact with the application to generate both storage requests and access requests. A storage request from the application can be provided to the classification module which classifies textual content of the file associated with a given request, and then stores that file along with its classification information. Note the application may be used to access external content, such as content found elsewhere on a network with which the system is communicatively coupled (e.g., LAN and/or wide area network such as Internet). The user can also access any classified files as well as any unclassified files, and can also provide feedback to the classification module, via the user interface module. The touch screen allows interaction with the application and user interface module, although any number of other suitable interaction mechanisms can be used.

The application may be any application that allows a user to create, store, or otherwise access content having a textual content, whether in the form of discrete text or in another form that can be effectively extracted into text as previously explained. For instance, the textual content may be image-based text that is extracted via an image analysis and OCR process. Alternatively, or in addition to, the textual content may be audio-based text that is extracted using an audio-to-text conversion process. Alternatively, or in addition to, the textual content may be video-based text (which effectively may include image-based text and/or audio-based text) that is extracted using an OCR-based image analysis process and/or an audio-to-text conversion process. The application may be, for instance, a word processing application, a spreadsheet application, a presentation application, a browser application, an image processing application (e.g., Adobe Photoshop), a multimedia application (e.g., Adobe Director), an email application, a texting or messaging application, a desktop publishing application, or any other application that can effectively create and/or access, or otherwise operate with and store arbitrary and diverse textual content files. Note that the application may be used to create the content in some cases, but in other cases the application may be used to store content that has been created elsewhere.

The touch screen can be implemented with any suitable touchscreen technology. Other embodiments may not include a touch screen, but may instead include a regular display (e.g., LCD, CRT, etc) along with input devices such as a keyboard and mouse. Other embodiments may include both touch screen capability and other input devices such as keyboards, mouse, touch pads, etc. The claimed invention is not intended to be limited to any particular type of input devices.

The classification module is programmed or otherwise configured to intercept or otherwise receive storage requests so that storage bound content can be classified as part of the storage function, in accordance with an embodiment. In some example embodiments, the storage request includes a file to be stored. In other embodiments, the storage request may include an address or pointer that indicates where the file to be stored is currently located. In any case, access to the file to be stored is provided to the classification module which is further configured to extract textual content from that file and to analyze that content to identify one or more categories to which that file can be assigned. The classification process itself can be carried out by a classification engine (within the module) that is implemented using any number of commercially available or proprietary classification engines capable of automatically concept tagging or otherwise classifying files into concept bins/categories, in accordance with some embodiments. Example text extraction and classification engines include Salience by Lexalytics, Lingo3D by Carrot Search, IDOL by Autonomy, and AlchemyAPI by AlchemyAPI. There are also a number of open source tools available, such as the Natural Language Toolkit by NLTK.org and the DragonTookKit from Drexel University. Other concept classification engines can be used as well, and the claimed invention is not intended to be limited to any particular classification engine.

As previously explained, the classification module may be further configured to extract text from media types other than straight text, in accordance with some embodiments. Thus, the classification engine within the classification module may be supplemented by, for example, an image processing engine that is configured to carry out OCR on images so as to extract text from those images. Once the text is liberated from the image by the OCR process, it can then be provided to the classification engine of the classification module. Similarly, once text is extracted from an audio file or a video file, it can then be provided to the classification engine. There are numerous commercially available online or desktop tools capable of carrying out image-based text extraction and audio-based text extraction (e.g., SimpleOCR by SimpleSoftware, OpenOCR by Cognitive Technologies, and Dragon Speech Recognition by Nuance). Any such techniques can be implemented, for example, in a module operatively coupled to the input of classification module.

In general, one way to think about classification is to imagine some multi-dimensional space in which the content of each document or file is represented by a point in that space. Files have content that is similar are located close to each other, and documents of dissimilar content are farther away. In accordance with an embodiment of the present invention, imagine that a set of fixed points is located in that space, and those points represent various categories into which files to be saved can be filed. For a given file, the so-called 'distance' from that file to each of the category locations can be measured by the classification process. As will be appreciated, distance in this example context refers to how well, or the degree to which, a given file to be saved fits within a given category. A document/file can be classified in the category, for example, which has the shortest distance or in multiple categories that have a distance within a given threshold.

Thus, once the textual content of the file being saved is extracted and classified, the classification module may be further configured to assign that file to one or more categories based on its classification, in accordance with an embodiment of the present invention. The categories can vary from one embodiment to the next and may include, for example, any number of diverse categories that cover a broad range of distinct topics and fields, or any number of diverse categories that cover a broad range of distinct topics with a given field, or some combination thereof. In some embodiments, a pre-defined set of categories that will be of general use can be provided. The number of categories can vary greatly, but in some embodiments is in the range of 50 to 100 categories. One identified, these categories can then be used to configure and train an appropriate classification engine. As will be appreciated in light of this disclosure, the categories provided can be set as desired and may depend on factors such as the classification engine employed and the type of content preferred or otherwise stored by the user. Table 1 shows an example set of categories, in accordance with an embodiment. Numerous other category concept schemes can be used (e.g., numerous diverse subject matter across numerous fields and/or numerous diverse topics within a single given field, depending on the application), and the claimed invention is not intended to be limited to any particular set of category concepts.

TABLE 1

Example Concept Categories

Advertising
Agriculture
Art
Auto
Aviation
Banking
Beverages
Biotechnology
Books
Business
Computer Hardware
Contracts
Crime
Disasters
Economics
Education
Elections
Fashion
Finance
Food
Health
Home
Hotels
Intellectual Property
Investing
Labor
Law
Marriage
Mobile Devices
Philosophy
Politics
Presentations
Real Estate
Receipts
Recipes
Religion
Renewable Energy
Resumes
Robotics
Science
Social Media
Sociology
Software and Internet
Space
Sports
Technology
Traditional Energy
Travel
Video Games
War
Weather The storage can be implemented, for example, with any suitable type of memory, such as a disk drive included in, or otherwise in communication with, the user's computing system. Other suitable memories include flash memory, random access memory (RAM), a memory stick or thumb drive, USB drive, etc. The storage is shown as local to the user, but as will be appreciated in light of this disclosure, the memory may also be remote to the user, such as a server-based memory associated with a given cloud storage service. In a more general sense, any memory facility can be used to implement the storage. Once a save function for a given file is initiated and the file is classified, the now classified file is stored in the storage to complete the save function initiated by the user.

The category tag(s) assigned to the file by the classification module can be stored with the file, for example, as content metadata or hidden data otherwise associated with the file. In some embodiments, the storage includes a lookup table (LUT) structure, where the table is indexed by the tags, such as shown in the example of Table 2. In such cases, a retrieval request

TABLE 2

Tag-based Lookup Table

| Category Tags | Files |
|---|---|
| Agriculture | Farming.pdf |
| | Hiring a Veteran.pdf |
| Art | Guide to Impressionism |
| Auto | Top 10 Drivable Roads.pdf |
| Aviation | <none> |
| . | . |
| . | . |
| . | . |
| Video Games | <none> |
| War | Local Veteran Support.pdf |
| | Hiring a Veteran.pdf |
| Weather | East Coast Fault Line.pdf | to the storage will return all files associated with the tag(s) included in the request. Note that not all tags need to be associated with files, and that some tags may be associated with multiple files. Further note that a given file may be associated with multiple tags. In other embodiments, the title of the file can be modified to include the tag(s) or a suitable abbreviation thereof as a suffix or prefix to the existing title as shown in the example of Table 3, so a retrieval request indicating

TABLE 3

Example Tagged Files
Tagged Files

Agr_Farming.pdf
Agr_Hiring a Veteran.pdf
Art_Guide to Impressionism
Aut_Top 10 Drivable Roads.pdf
<none>
.
.
.
<none>
War_Local Veteran Support.pdf
War_Hiring a Veteran.pdf
Wea_East Coast Fault Line.pdf one or more tags will similarly return the files of interest. Thus, the user can access and view external content using the computing system and, if so desired, save that content to the computing system by way of the classification module. As further shown, the storage may further include unclassified files if so desired, which may be saved to the memory directly by a given application rather than through the classification module. In some embodiments, such unclassified files can be accessed by the classification module during a re-save request initiated by the user and re-saved into the classified part of the storage.

The user interface module is programmed or otherwise configured to intercept or otherwise receive file access requests so that stored content can be accessed as part of the retrieve or search function, in accordance with an embodiment. In some example embodiments, the access request may specify a file to be retrieved, such as specific files stored in the classified files w/textual content portion and/or the unclassified file portion of the storage. Alternatively, in some embodiments, the access request may specify one or more categories associated with files to be retrieved. In the example embodiment shown, the user interface module is configured to receive a file access request from the application, and to present the user with a graphical user interface (via the touch screen display) that allows the user to select or otherwise specify the particular files of interest, by either selecting file names and/or content categories. FIGS. 5a-d illustrate example graphical user interfaces configured in accordance with some such embodiments, and will be discussed in turn.

The user interface module of this example embodiment is further configured to allow the user to provide feedback to the classification module. For instance, the user may view the various available content categories, add additional content categories, modify or delete existing content categories, and/or change the category (or categories) to which a given file is assigned. In some embodiments, the classification engine in the classification module is effectively capable of learning based on such user input and can recalibrate or otherwise change its classification process so that future classifications reflect the user feedback. In some such cases, the classification module may be further configured to re-classify the previously classified files stored in the classified files w/textual content portion of the storage. Any number of classification engine training techniques can be employed to provide customized classification based on specific user feedback.

Figure 2:
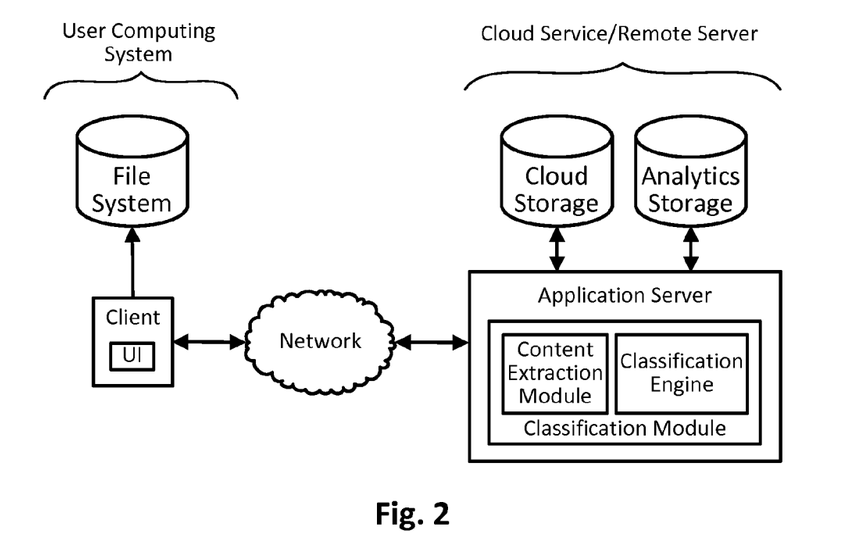
FIG. 2 illustrates a document classification system configured in accordance with another embodiment of the present invention.

The classification module will be discussed in further detail with respect to FIG. 3. Likewise, the user interface module will be discussed in further detail with respect to FIGS. 4 and 5a-d. In the meantime, FIG. 2 illustrates a document classification system configured in accordance with another embodiment of the present invention. This system is similar to the system shown in FIG. 1, except that the user interface module is executing or otherwise implemented on a client that is remote to an application server upon which the classification module is executing. Such a client-server embodiment may be suitable, for example, for use in the context of an online repository service that allows a user/client to upload files via the server for storage. Note that the user interface module may be installed local to the client, or an applet or other downloadable module that can be provisioned in real-time to a client requesting access to the cloud service (e.g., any Internet-based storage service). In one such embodiment, the user interface module is provisioned in real-time to the client as a JavaScript applet in response to a user request for access to the cloud service, but any other suitable code and provisioning schemes can be used, as will be appreciated.

In operation, a user can access files stored locally to the user in the file system, and may also access files stored remotely to the user such as files downloaded or otherwise accessed via the Internet or other communication network (e.g., local and/or wide area network of a company, etc). The file system of the user computing system can be implemented with any number of suitable file storage schemes. Likewise, the user's client can be implemented with any suitable computing device (e.g., laptop, desktop, tablet, smartphone, etc). The user interface module (UI) executing on the client may be configured to allow for file access as typically done, and may be further configured with user interface capability to allow for the issuance of user storage and access requests as described herein. The requests can be communicated to the application server via the network (e.g., which may include, for instance, a LAN operatively coupled to the Internet).

Storage requests can be carried out in a similar fashion as previously described with reference to FIG. 1, wherein the classification module executing on the server receives the storage request and textual content is then extracted from the file to be stored via the content extraction module. The extracted textual content is then classified via the classification engine using any number of known concept classification techniques, such as those previously described. The classified file(s) can then be stored in the cloud storage. Likewise, access requests can be carried out in a similar fashion as previously described with reference to FIG. 1, wherein the application server receives the access request via the UI executing on the client provides access to the appropriate file(s) that satisfy that request. The classified file(s) stored in the cloud storage can be returned to the client via the network and displayed to the user via the UI executing on the client.

The UI executing on the client may be further programmed or otherwise configured to allow the user to provide feedback to the classification module as previously explained. In the example embodiment of FIG. 2, the feedback data provided by the user can be stored in the analytics storage. Thus, files may flow through the system in a number of ways. In one example case, the user may choose a file from the local file system, and then upload that file to the cloud service application server. The application server may then store the content of the file in the cloud storage system, extract textual content from the file, and send textual content to the classification engine for analysis. Note that order of these storage-based functions may vary (e.g., store-extract-send-analyze, or extract-send-analyze-store, or extract-store-send-analyze, or extract-send-analyze/store where analysis and storing occur at least partially at the same time, etc), but when considered in the aggregate, form a complete storage function that is responsive to a user-initiated storage request, in accordance with an embodiment of the present invention. In any such cases, the classification engine may then return suggested categories, and the application server may assign corresponding tags to the file and stores this information in the cloud storage. The user can subsequently view all files assigned to a given category, and can also see the categories assigned to a given file. In addition, the user can adjust the assigned categories, which in turn updates the tag information associated with the stored file. User-initiated updates can be collected and analyzed to improve the algorithms in the classification engine.

As will be appreciated in light of this disclosure, the various modules and components of the system, such as the classification and user interface modules, can be implemented in software, such as a set of instructions (e.g. C, C++, object-oriented C, JavaScript, BASIC, etc) encoded on any computer readable medium (e.g., hard drive, server, or other suitable memory), that when executed by one or more processors, cause the various methodologies provided herein to be carried out. In other embodiments, the components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number embedded routines for carrying out the functionality described herein. Any suitable combination of hardware, software, and firmware can be used.

Storage-Based Classification Methodology

Figure 3:
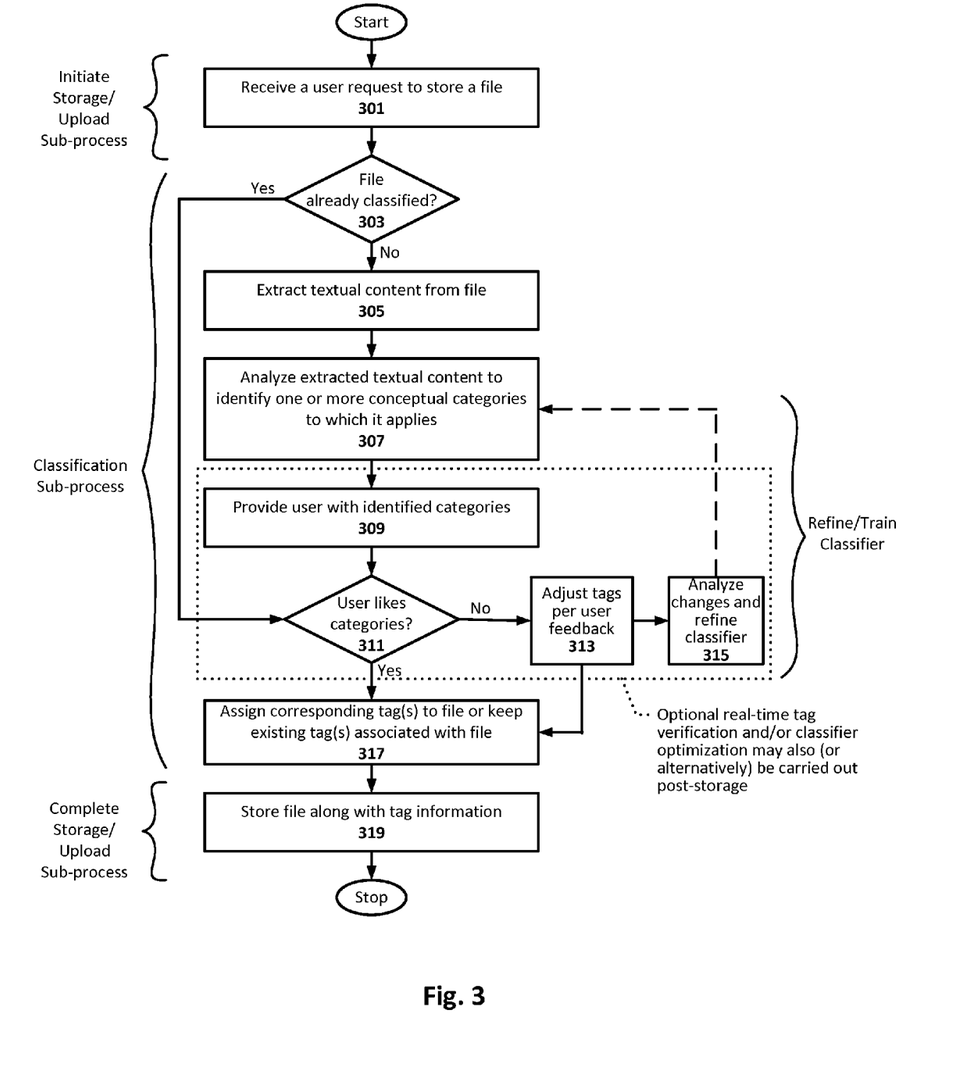
FIG. 3 illustrates a document classification methodology configured in accordance with an embodiment of the present invention.

FIG. 3 illustrates a document classification methodology configured in accordance with an embodiment of the present invention. As can be seen, the methodology of this example embodiment includes a number of phases or sub-processes including a user-initiated storage/upload sub-process, a classification sub-process, and complete storage/upload sub-process. This method may be implemented, for example, by either of the classification modules shown in FIGS. 1 and 2, respectively. As previously explained, the order of these sub-processes may vary from one embodiment to the next, but when considered in the aggregate, from a complete storage function that is responsive to a user-initiated storage request, in accordance with an embodiment of the present invention.

The method commences with receiving 301 a user request to store a file. The request may be provided locally as shown in FIG. 1 or remotely as shown in FIG. 2. In any case, this request triggers the classification sub-process, which may also be carried out locally as shown in FIG. 1 or remotely as shown in FIG. 2. The classification sub-process of this example embodiment includes determining 303 whether the file is already classified. If not, then the method continues with extracting 305 textual content from the file and analyzing 307 the extracted textual content to identify one or more conceptual categories to which it applies. This analysis may include, for example, typical analysis performed by any of the concept classification tools previously discussed (e.g., Salience by Lexalytics, Lingo3D by Carrot Search, IDOL by Autonomy, and AlchemyAPI by AlchemyAPI), and/or any other suitable classification schemes/tools.

The classification sub-process continues with optionally providing 309 the user with one or more identified categories. In this example embodiment, the user is then given an opportunity to review the provided categories pre-storage. In particular, the classification sub-process of this example case further includes determining 311 if the user likes the provided categories. If so, the classification sub-process continues with assigning 317 the corresponding tag(s) to the file. Further note that, in cases where the determination at 303 indicates that the file is already classified, then the classification sub-process jumps to the determination at 311. In this case, if the user likes the provided categories, then no new tags need to be assigned and the classification sub-process continues with keeping 317 the existing tags associated with file. Once the tags are assigned or otherwise established as acceptable, the methodology continues with storing 319 the file along with tag information. Again, this storage may be provided locally as shown in FIG. 1 or remotely as shown in FIG. 2.

If the determination at 311 indicates that the user does not like the provided categories, the classification sub-process may optionally include adjusting 313 the tags per user feedback. In some such cases, the classification sub-process may optionally further include analyzing 315 the changes and refining or otherwise training the classification engine accordingly, so that future file classifications will reflect that user feedback, as indicated by the dashed line from 315 to 307.

Note in this example embodiment that the user has the optional opportunity to verify the desirability of the tagging in real-time before the document is stored or as a part of the document storage process. In another example embodiment, and as further indicated in FIG. 3, the process flow may proceed from 307 directly to 317, wherein the tags are assigned at storage time with no real-time user review or classifier optimization. However, in some such cases, the user may examine the tags and revise as desired, as a post-storage activity. For instance, in one such case, the functions at 309, 311, 313, and 315 can be carried out sometime after 319. Numerous variations on the overall storage-based classification methodology will be apparent in light of this disclosure.

User Interface Methodology

Figure 4:
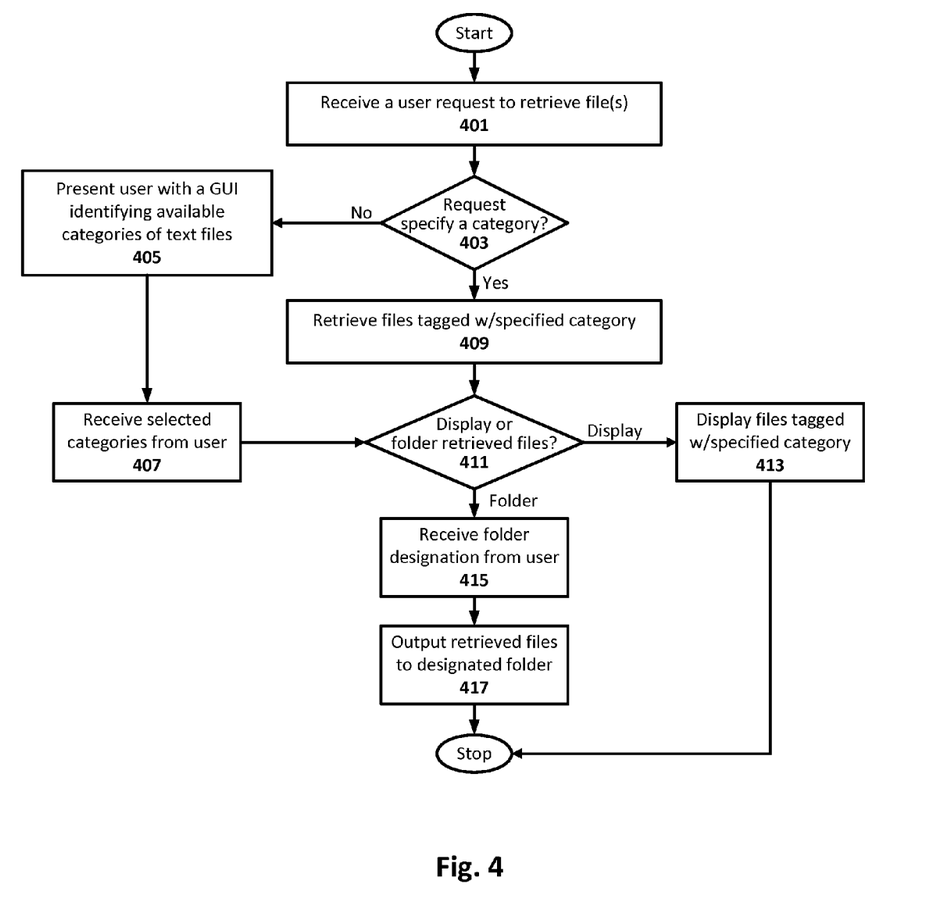
FIG. 4 illustrates a user interface methodology that can be employed by a document classification system, in accordance with an embodiment of the present invention.

FIG. 4 illustrates a user interface methodology that can be employed by a document classification system, in accordance with an embodiment of the present invention. This method may be implemented, for example, by either of the user interface modules shown in FIGS. 1 and 2, respectively.

Figure 5B:
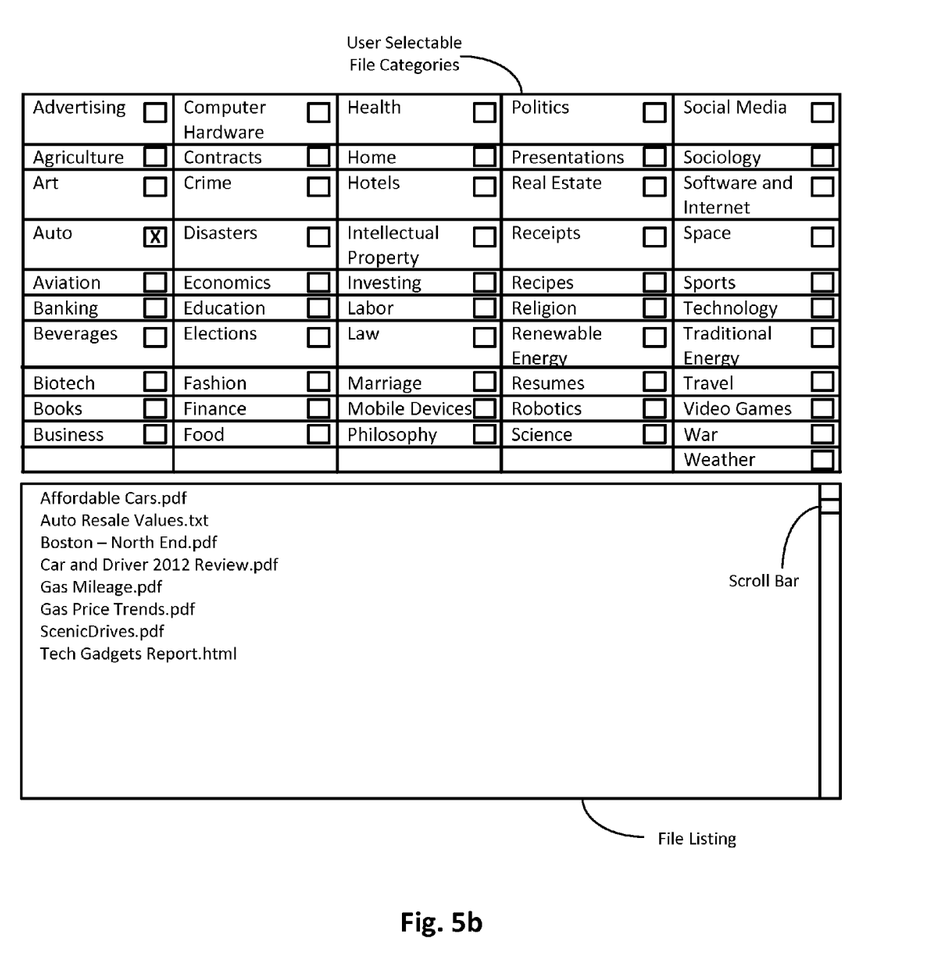

The methodology commences with receiving 401 a user access request to retrieve one or more files, and determining 403 if that request specifies a category. As will be appreciated, classified files as described herein can be associated with one or more concept categories and corresponding tags that assist with efficiently providing a user access to those files. If the request does not specify a category, the methodology continues with presenting 405 the user with a graphical user interface (GUI) identifying available categories of text files, and subsequently receiving 407 one or more selected categories from the user. FIG. 5a illustrates an example screen shot of a graphical user interface that can be presented to the user at 405, in accordance with an embodiment of the present invention. As can be seen, the GUI includes a number of user selectable file categories, which in this example case cover a broad range of diverse content and subject matter. Below the user selectable file categories is a listing of all the available files, along with a scroll bar user interface. Note that all the available files are shown, because no user selection in the user selectable file categories has been provided yet. FIG. 5b shows an example case where the user has made a selection in the user selectable file categories, by checking the Auto radio button (or any other suitable user selection mechanism). This selection of the Auto category can be the selected category received at 407, in accordance with some embodiments.

Figure 5C:
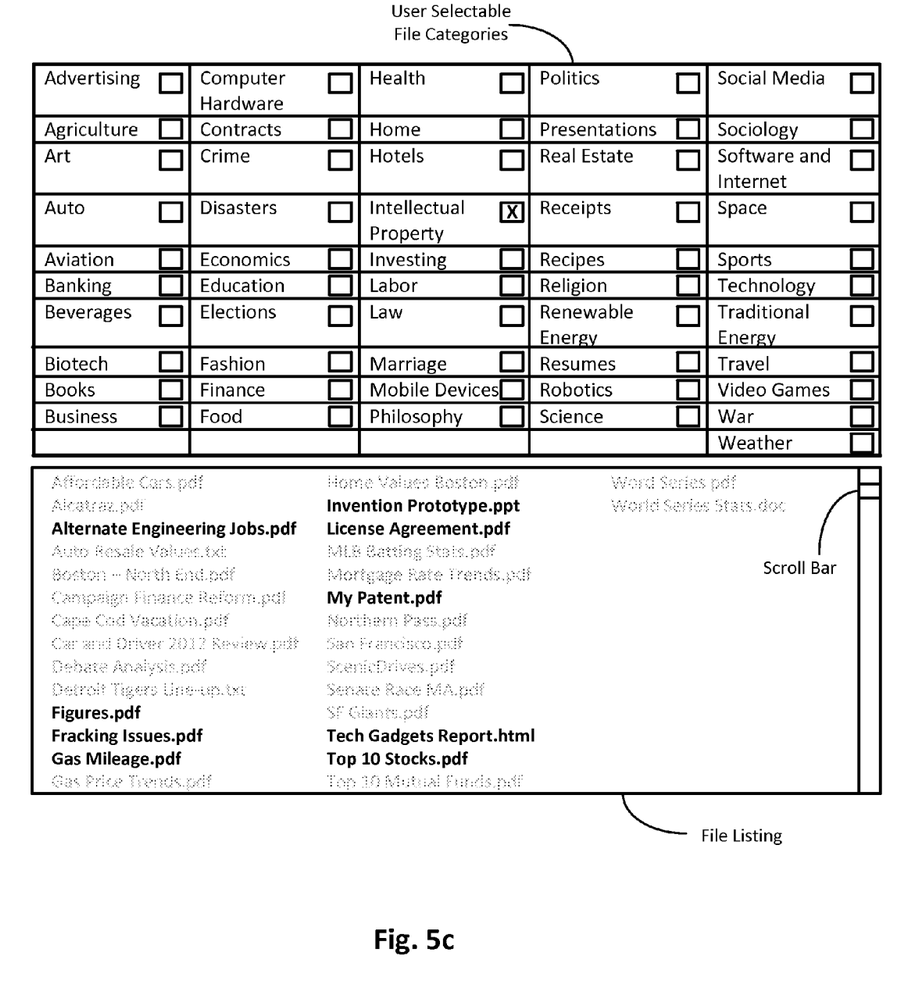

If, on the other hand, the access request from the user does specify a category, the methodology continues with retrieving 409 any files tagged with the specified category or categories, and then determining 411 if the retrieved file(s) should be displayed or foldered. If displayed, then the methodology continues with displaying 413 the files tagged with the specified category (or categories). For instance, FIG. 5b shows an example GUI display of files, which is effectively a culled down version of the total files shown in FIG. 5a, in response to the user selection of the Auto category. As previously explained, note that some of the files retrieved may not even use the term 'auto', but rather discuss concepts that can be generally classified as having to do with the concept category of Auto. FIG. 5c shows an example GUI display of files in accordance with another embodiment, wherein the total files shown in FIG. 5a are still shown but files associated with unselected categories are greyed out (or otherwise minimized), in response to the user selection of the Intellectual Property category. Numerous display schemes can be used, and the claimed invention is not intended to be limited to any particular such scheme.

Figure 5D:
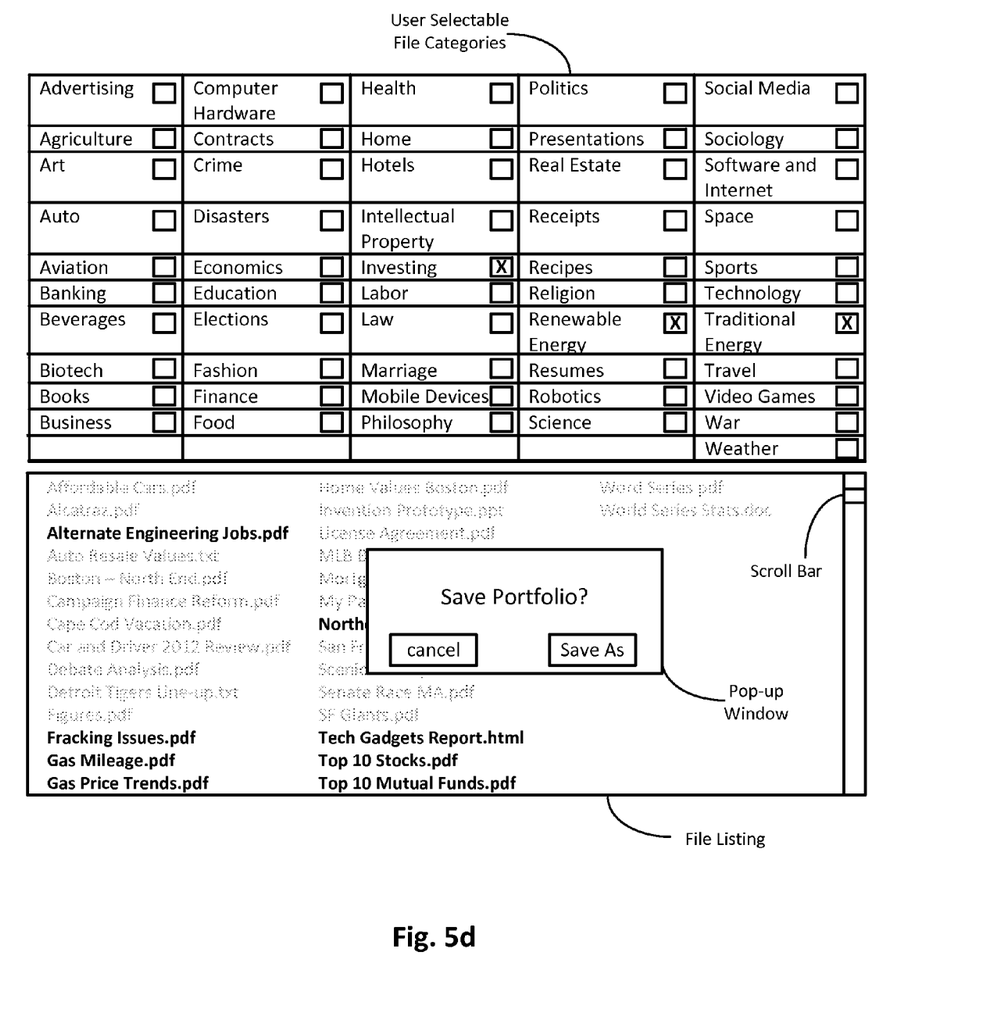

If, on the other hand, the determination at 411 indicates a preference of foldering, then the methodology of this example embodiment continues with receiving 415 a folder designation from the user, and outputting 417 the retrieved files to designated folder. FIG. 5d shows an example GUI display of files in accordance with one such embodiment, wherein the total files shown in FIG. 5a are still shown but files associated with unselected categories are greyed out (or otherwise minimized), in response to the user selection of the Investing, Renewable Energy, and Traditional Energy categories. In addition, the user is being given an opportunity to save the retrieved (darkly displayed) files to a folder or portfolio, by virtue of a pop-up window (or any other suitable such user interface mechanism). The user can also select Cancel in the pop-up window to only display the files.

Numerous embodiments will be apparent, and features described herein can be combined in any number of configurations. One example embodiment of the present invention provides a file classification system. The system includes a content extraction module configured to, in response to a storage request for a file, extract textual content of the file. The system further includes a classification engine configured to analyze the extracted textual content to determine a concept category to which the file can be assigned, and to assign corresponding tag information to the file. In some cases, the system further includes a storage for storing the file and its tag information. In some such cases, the storage is Internet-based storage that is remote to system user. In other such cases, the storage is local to system user. In some cases, the system includes a user interface module configured to receive user access requests to retrieve stored files that have been classified by the classification engine. In some cases, the system includes a user interface module configured to receive access requests that specify tag information, and to retrieve stored files that have been assigned that tag information by the classification engine. In some cases, the system includes a user interface module configured to provide a full listing of stored files classified by the classification engine, and to provide a culled listing of those files in response to a file access request that specifies tag information, wherein the culled listing highlights or otherwise indicates files that have been assigned that tag information by the classification engine. In some cases, the system includes a user interface module configured to allow a user to review at least one of the concept category and/or tag information assigned to the file, and to receive user updates with respect to same. In one such case, the classification engine is further configured to refine classification it carries out based on the user updates. In some cases, the system is further configured to store the file and its tag information.

Another embodiment of the present invention provides a file classification system. In this example case, the system includes a storage. The system further includes a classification module configured to, in response to a storage request for a file, extract textual content of the file, analyze the extracted textual content to determine a concept category to which the file can be assigned, assign corresponding tag information to the file, and save the file and tag information in the storage. The system further includes a user interface module configured to receive access requests that specify tag information, and to retrieve stored files from the storage that have been assigned that tag information by the classification module. In some cases, the storage is Internet-based storage that is remote to system user. In other cases, the storage is local to system user. In some cases, the storage and content analysis module are part of an Internet-based storage service. In one such case, the user interface module is provisioned in real-time to a remote client that has access to the Internet-based storage service. In some cases, the user interface module is further configured to provide a full listing of stored files classified by the classification module, and to provide a culled listing of those files in response to a file access request that specifies tag information, wherein the culled listing highlights or otherwise indicates files that have been assigned that tag information by the classification module. In some cases, the user interface module is further configured to allow a user to review at least one of the concept category and/or tag information assigned to the file, and to receive user updates with respect to same. In some cases, the classification module is further configured to refine classification it carries out based on the user updates.

Another embodiment of the present invention provides a file classification methodology. The method includes, in response to a storage request for a file, extracting textual content of the file. The method further includes analyzing the extracted textual content to determine a concept category to which the file can be assigned, assigning corresponding tag information to the file, and storing the file and its tag information. In some cases, storing the file and its tag information is carried out using Internet-based storage that is remote to system user. In some cases, storing the file and its tag information is carried out using a storage local to system user. In some cases, the method includes receiving user access requests that specify tag information, and retrieving stored files that have been assigned that tag information. In some cases, the method includes providing a full listing of stored files, and providing a culled listing of those files in response to a file access request that specifies tag information, wherein the culled listing highlights or otherwise indicates files that have been assigned that tag information. In some cases, the method includes allowing a user to review at least one of the concept category and/or tag information assigned to the file, and receiving user updates with respect to same. In some such example cases, the method further includes refining file analysis based on the user updates. Numerous variations will be apparent in light of this disclosure. For example, another embodiment of the present invention provides a computer readable medium having instructions encoded thereon that when executed by one or more processors cause a file classification process to be carried out, wherein the process includes functionality as variously defined in this paragraph.

The foregoing description of example embodiments of the invention has been presented for the purposes of illustration and description. It is not intended to be exhaustive or to limit the invention to the precise forms disclosed. Many modifications and variations are possible in light of this disclosure. It is intended that the scope of the invention be limited not by this detailed description, but rather by the claims appended hereto.

What is claimed is:

1. A file classification system, comprising:
a content extraction module configured to, in response to a storage request for a file, extract textual content of the file;
a classification engine configured to analyze the extracted textual content to determine a first concept category to which the file can be assigned, and to assign tag information corresponding to the first concept category to the file; and
a user interface module configured to display the first concept category and receive a selection of a second concept category from a user;
wherein the classification engine is further configured to assign tag information corresponding to the second concept category to the file.

2. The system of claim 1 further comprising a storage for storing the file and its tag information.

3. The system of claim 2 wherein the storage is Internet-based storage that is remote to the user.

4. The system of claim 2 wherein the storage is local to the user.

5. The system of claim 1 wherein the user interface module is further configured to receive user access requests to retrieve stored files that have been classified by the classification engine.

6. The system of claim 1 wherein the user interface module is further configured to receive user access requests that specify query tag information, and to retrieve stored files that have been assigned tag information that corresponds to the query tag information by the classification engine.

7. The system of claim 1 wherein the user interface module is further configured to provide a full listing of stored files classified by the classification engine, and to provide a culled listing of those files in response to a file access request that specifies query tag information, wherein the culled listing indicates files that have been assigned tag information that corresponds to the query tag information by the classification engine.

8. The system of claim 1 wherein the system is further configured to store the file and its tag information.

9. A file classification system, comprising:
a storage;
a classification module configured to, in response to a storage request for a file, extract textual content of the file, analyze the extracted textual content to determine a concept category to which the file can be assigned, assign corresponding tag information to the file, and save the file and tag information in the storage; and
a user interface module configured to receive access requests from a first user that specify query tag information, to retrieve stored files from the storage that have been assigned tag information that corresponds to the query tag information by the classification module, and to present the first user with an option of (a) displaying a listing of the retrieved files, or (b) storing the retrieved files in a designated folder.

10. The system of claim 9 wherein the storage is Internet-based storage that is remote to the first user.

11. The system of claim 9 wherein the storage is local to the first user.

12. The system of claim 9 wherein the storage and the classification module are part of an Internet-based storage service.

13. The system of claim 12 wherein the user interface module is provisioned in real-time to a remote client that has access to the Internet-based storage service.

14. The system of claim 9 wherein the user interface module is further configured to provide a full listing of stored files classified by the classification module, and to provide a culled listing of those files in response to a file access request that specifies the query tag information, wherein the culled listing indicates files that have been assigned tag information that corresponds to the query tag information by the classification module.

15. The system of claim 9 wherein the user interface module is further configured to allow a second user to review the first concept category assigned to the file, and to receive a selection of a second concept category from the second user.

16. The system of claim 15 wherein the classification module is further configured to assign tag information corresponding to the second concept category to the file.

17. A file classification methodology, comprising:
in response to a storage request for a file, extracting textual content of the file;
analyzing the extracted textual content to determine a first concept category to which the file can be assigned;
assigning tag information corresponding to the first concept category to the file;
displaying the first concept category and receiving a selection of a second concept category from a user;
assigning tag information corresponding to the second concept category to the file; and
storing the file and its tag information.

18. The method of claim 17 wherein storing the file and its tag information is carried out using Internet-based storage that is remote to the user.

19. The method of claim 17 wherein storing the file and its tag information is carried out using a storage local to the user.

20. The method of claim 17 further comprising receiving user access requests that specify query tag information, and retrieving stored files that have been assigned tag information corresponding to the query tag information.

21. The method of claim 17 further comprising providing a full listing of stored files, and providing a culled listing of those files in response to a file access request that specifies query tag information, wherein the culled listing indicates files that have been assigned tag information that corresponds to the query tag information.

22. A computer readable medium having instructions encoded thereon that when executed by one or more processors cause a file classification process to be carried out, the process comprising:
- in response to a storage request for a file, extracting textual content of the file;
- analyzing the extracted textual content to determine a first concept category to which the file can be assigned;
- assigning tag information corresponding to the first concept category to the file;
- displaying the first concept category and receiving a selection of a second concept category from a user;
- assigning tag information corresponding to the second concept category to the file; and
- storing the file and its tag information.

* * * * *